United States Patent [19]

Thomas et al.

[11] Patent Number: 4,873,573
[45] Date of Patent: Oct. 10, 1989

[54] VIDEO SIGNAL PROCESSING FOR BANDWIDTH REDUCTION

[75] Inventors: Graham A. Thomas, Tadworth; Timothy J. Borer, Banstead, both of United Kingdom

[73] Assignee: British Broadcasting Corporation, London, England

[21] Appl. No.: 127,664

[22] PCT Filed: Dec. 23, 1986

[86] PCT No.: PCT/GB86/00795
§ 371 Date: Jan. 25, 1988
§ 102(e) Date: Jan. 25, 1988

[87] PCT Pub. No.: WO87/05770
PCT Pub. Date: Sep. 24, 1987

[30] Foreign Application Priority Data

Mar. 19, 1986 [GB] United Kingdom ............ 8606809
Jul. 16, 1986 [GB] United Kingdom ............ 8617320
Sep. 4, 1986 [GB] United Kingdom ............ 8621330

[51] Int. Cl.$^4$ .................................... H04N 7/12
[52] U.S. Cl. ................................ 358/133; 358/138; 358/105
[58] Field of Search ............ 358/133, 138, 136, 135, 358/105, 140

[56] References Cited

U.S. PATENT DOCUMENTS 4,692,801 9/1987 Ninomiya et al. ............ 358/138 X
4,745,474 5/1988 Schiff ............................ 358/105 X
4,768,092 8/1988 Ishikawa ....................... 358/105 X

FOREIGN PATENT DOCUMENTS 0146713 10/1984 European Pat. Off.
2144301A 7/1984 United Kingdom.

Primary Examiner—James J. Groody
Assistant Examiner—Victor R. Kostak
Attorney, Agent, or Firm—Robert F. O'Connell

[57] ABSTRACT

At the transmitter a coder includes a motion vector generator providing vectors (MV) describing the movement of individual blocks of pixels. The video signal is 4:1 compressed in bandwidth by pre-filters and a subsampling unit to produce a signal (SSH) from which a high-definition image can be re-constructed in the coder and in the decoder. The sampling lattice is shifted in accordance with the motion vectors (MV) which are digitally transmitted along with the compressed bandwidth analogue signal, to enable the samples to be correctly located in the reconstructed image. Poorly correlated moving areas are handled by pure spatial filtering (pre-filter and sub-sampling unit) with reconstruction by spatial interpolation. The two reconstructed signals (RVH and RVL) at the coder are compared in a mode selector with the input video and a switch is set to transmit whichever of the compressed signals (SSH, SSL) gives the best match. A mode signal is also transmitted and, at the receiver decoder this operates a switch to select (RVH') or (RVL') correspondingly for feeding to the display. In a modified embodiment the sub-sampling unit does not employ a moving lattice but all samples for a four field sequence are taken from one field of each sequence.

25 Claims, 14 Drawing Sheets

4,873,573

VIDEO SIGNAL PROCESSING FOR BANDWIDTH REDUCTION

BACKGROUND OF THE INVENTION

1. Field of the Invention

The present invention relates to methods of coding and decoding video signals, to enable the bandwidth of the transmitted (or recorded) signal to be reduced. Although the invention is described in detail with reference to the European 625 line, 50 field/s interlaced standards, the invention is not restricted to any particular standards and may be used with both interlaced and non-interlaced (sequential) systems. Whenever the terms transmitter and receiver are employed (or analagous terms), the terms recorder and playback machine may be understood as unwritten alternatives. The invention is of particular utility in transmitting HDTV (high definition television).

2. Description of the Related Art

1. Chiariglione, L., Corgnier, L. and Guglielmo, M.Pre- and Post-Processing in a Video Terminal using Motion Vectors. 1986. I.B.C. Brighton 1986.

2. Girod, B., Thoma, R. Motion-compensating conversion without loss of vertical resolution line-interlaced television systems. Eurasip Workshop on 'Coding of HDTV Signals', L'Aquila, November 1986.

3. Storey, R. HDTV Motion Adaptive Bandwidth Reduction using DATV. BBC Research Department Report 1986/5. British Patent Application No. 85 31777.

4. Storey, R. Compatible Transmission of HDTV in a 625 line Channel. British Patent Specification No., 86 20110.

5. Thomas, G. A. Bandwidth Reduction by Adaptive Subsampling and Motion Compensation DATV Techniques. October 1986. 128th SMPTE Technical Conference, Oct. 24–29 1986, New York. British Patent Applications 86 06809 and 86 17320.

6. Ninomiya, Y. et al. 1984. A Single Channel HDTV Broadcast System, The MUSE. NHK Laboratory Note No. 304.

SUMMARY OF THE INVENTION

It is possible to effect bandwidth reduction of a still picture by sub-sampling, transmitting different sets of sub-sampling points in a cyclic sequence of fields, e.g. a sequence of four fields, and building up the picture at the receiver by accumulating the points from each cycle of fields. The bandwidth reduction is achieved essentially by temporal filtering. Further reduction may be effected by transmitting only some points in this way and creating the others at the receiver by interpolation.

The temporal filtering procedure cannot be applied to a moving picture area as it would blur the image. It has already been proposed to switch to a low spatial detail filter to provide the compressed bandwidth signal for moving areas (Reference 3). However it is desirable to be able to transmit a moving area which maintains good correlation from field to field with high detail. The loss of resolution when a low spatial detail filter is used is very obvious.

The object of the present invention is to make it possible to effect bandwidth reduction in a manner such that correlated detail of moving areas is not lost.

BRIEF DESCRIPTION OF THE DRAWING

The invention is defined with particularity in the appended claims and will now be described in detail, by way of example, with reference to the accompanying drawings, in which:

DESCRIPTION OF THE PREFERRED EMBODIMENTS

Figure 1:
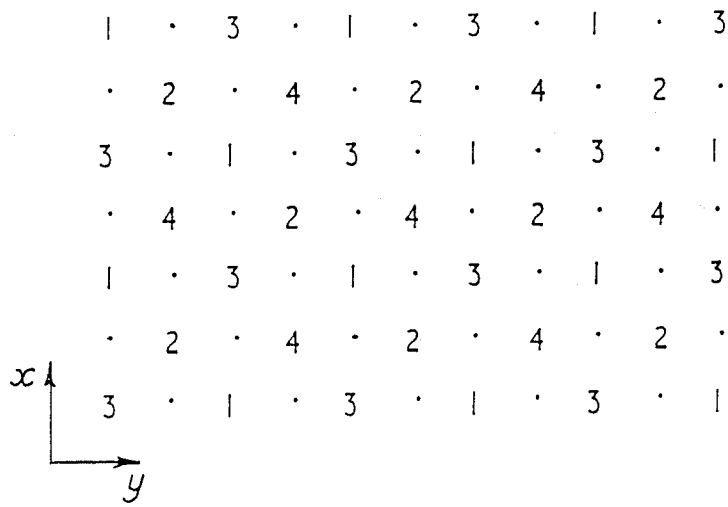
FIG. 1 represents a basic sample structure used in a bandwidth reduction system.
Figure 2:
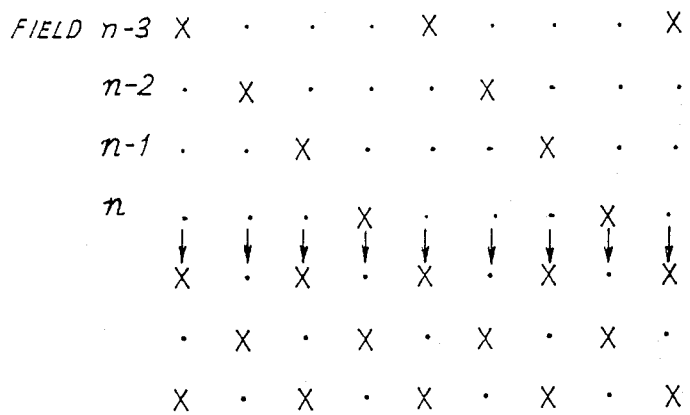
FIG. 2 represents reconstructing a detailed image in stationary areas.

In order to investigate motion adaptive bandwidth reduction systems, some hardware has recently been built (Ref. 1). This equipment contains two digital filters which filter an incoming monochrome 625 line TV signal in two different ways; one optimal for moving areas of the picture (a spatial filter) and one optimal for stationary ones (a temporal filter). Both types of filter reduce the bandwidth by a factor of 4 and hence allow the filtered signal to be resampled on a coarser sampling grid (FIG. 1) which has a 4 field repeat sequence. In FIG. 1, a dot represents a site which is not sampled. The numerals 1 to 4 represent the sites which are sampled in fields 1 to 4 respectively of a four-field repeat sequence. This method allows a highly detailed picture to be transmitted in stationary areas, as samples taken over a 4 field period can be accumulated in the receiver to build up a detailed image. This is illustrated in FIG. 2 in which the upper part is an "end-on" view of samples X coming into the receiver in successive fields n−3, n−2, n−1 and n, while the lower part shows the samples accumulated in the output picture. The dots are the unsampled sites (see FIG. 1) and these intervening points are interpolated in the receiver in a manner well known per se.

Figure 3A:
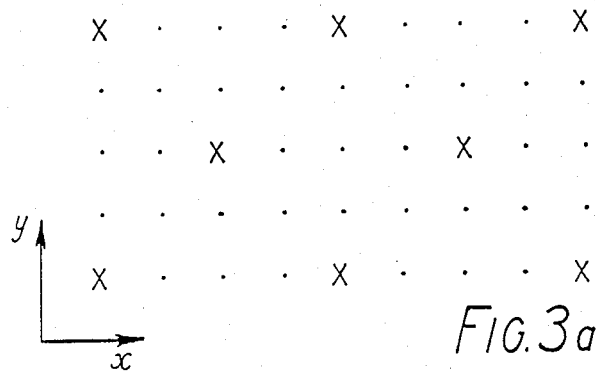
FIG. 3a represents an effective sampling lattice used in moving areas to act as a low spatial detail filter.
Figure 3B:
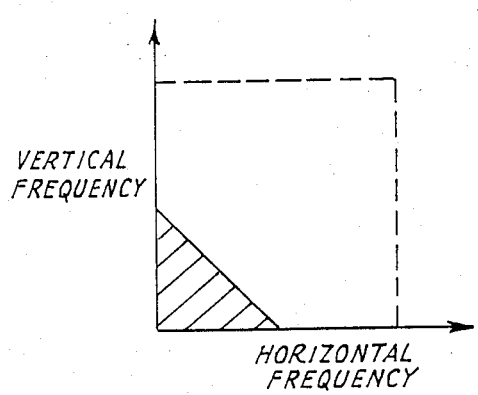
FIG. 3b represents the required prefilter characteristics.

In moving areas this technique cannot be used (since allowing samples to accumulate over a period of time would blur any moving object), so the output from the low spatial detail filter gives a better representation of the image. The signal from this filter can be fully represented by the samples taken in one field (FIG. 3a). FIG. 3B shows the characteristics required of a prefilter. The broken lines show the Nyquist limits in vertical and horizontal frequencies for a full sequential system. The hatched triangle denote the prefilter passband. The hardware selects which of the two transmission methods is most appropriate on a block-by-block basis, a block being shaped like a diamond about six pixels across. Information on which transmission mode has been selected for each block is sent to the receiver as a digital signal, so that it knows how to perform the reconstruction. We refer to this generally as DATV, meaning digitally-assisted television.

One major advantage of this bandwidth reduction method is that the bandwidth reduced signal can be viewed on a 'simple' receiver (without a framestore and having only a simple spatial interpolator) to give a recognisable picture. The only significant spuriae would be aliassing in areas sent in the 'high detail' mode since they have not been prefiltered in a way that enables the signal to be represented by only one field of samples. This produces an effect a bit like interline twitter horizontally and vertically, at a quarter of the field rate. Further, if a picture containing, say, 1249 lines was coded in this way, it is possible to transmit the samples in such a way as to make the signal 'look like' a 625 line signal.

This bandwidth reduction system has performed surprisingly well, but suffered from one major disadvantage, namely that the loss of resolution in areas of well correlated movement (that the eye can easily follow) was very obvious. In order to maintain a high spatial resolution in areas of well correlated motion, it is necessary, in accordance with the present invention, to be able to measure the speed and direction of movement of such motion, and move the subsampling lattice in such a way as to make the moving object appear stationary as far as the sampling structure is concerned.

There are thus two problems to be solved-first, a good technique of measuring motion vectors must be found, and secondly the details of how to use this information to improve the transmission system must be worked out.

The problem of finding a good motion measurement technique has been the subject of a study involving computer simulation of promising techniques. The results of these investigations are described elsewhere (Ref. 5).

This invention is concerned with the second problem, namely the application of motion vector information to bandwidth reduction systems using moving sampling structures. Algorithms investigated and results obtained are described.

The technique of motion vector measurement described in Ref. 5 involves performing a phase correlation between fairly large blocks in two successive pictures, and extracting the dominant vectors present by hunting for peaks in the correlation surface. Each pixel (or small block) in the picture is then assigned one of these vectors, on the basis of which vector gives the best match when the pixel (or block) in one picture is compared to the corresponding area in the other picture but displaced by the motion vector. Given below are the details of how this technique has so far been applied to the bandwidth reduction problem discussed here.

Each odd field of the input picture is divided into measurement blocks of 64 pixels by 32 lines (other similar sizes would probably work reasonably well, but it is convenient if they are powers of 2 since Fast Fourier Transforms are used to perform the correlation). A phase correlation (see Ref. 5) is performed between corresponding blocks in successive odd fields, and the correlation surface (without any prior interpolation) is searched to find the three largest peaks. The region of search can be limited to an area of the correlation surface corresponding to a 'sensible' range of velocities; however if the measurement blocks are only 64 pixels wide and the measurement is performed across a picture period, then the full range of $+/-32$ pixels per picture period is probably requiredc (equivalent to a maximum velocity of about a second per picture width).

The vector measurement and assignment is performed across a picture period rather than a field period for several reasons:

(a) this enables the correlation and matching processes to have access to samples taken from the same points spatially, which means that stationary objects with a high amount of vertical detail do not appear to be moving.

(b) all movements are twice the size that they would be if measurements were made across a field period, which actually enables them to be measured more accurately (on an absolute basis) and enables similar velocity vectors to be distinguished more easily, (c) since the vectors for the intermediate fields are interpolated from the 'picture based' vectors, there is only half as much vector information to transmit to the receiver, (d) the amount of vector measurement processing at the transmitter is halved.

Figure 4:
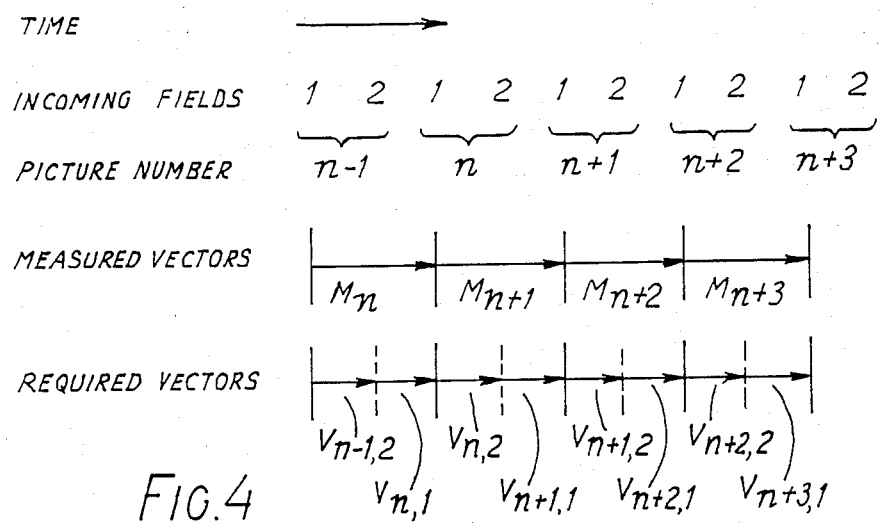
FIG. 4 represents the interpolation of velocity vectors when vectors are measured across a picture period.

The only penalty for this approach is that objects which accelerate significantly in a picture period will not be correclty tracked. However, this is a relatively rare occurrence. FIG. 4 shows how the velocity vector interpolation is performed. Given that the sum, of the motion over two fields is equal to the movement over one picture, we have $$M_n = V_{n-1,2} + V_{n,1}.$$

Moreover the vectors for field 2 are the average of the field 1 vectors on either side, so that $$V_{n,2} = \tfrac{1}{2}(v_{n,1} + V_{n+1,1}).$$

It should be noted that this interpolation technique cannot be used when the input signal comes, say, from a telecine, where both fields 1 and 2 refer to the same instant of time. In this situation, the motion vectors for field 2 would always be zero.

Each little diamond shaped transmission block is assigned one of the vectors measured in the correlation process. The list of 'menu vectors' from which a vector is selected is formed from the (maximum of) three vectors measured in the measurement block containing the transmission block (the 'central' block), along with the vectors measured in the immediately adjacent measuring blocks. Thus a maximum of 27 vectors could be tried. However, there is little point in trying several very similar vectors (the velocity of a large object will probably have been measured in several adjacent blocks) so vectors in neighbouring blocks are only included if they differ from vectors in the central block by more than a specified amount. A minimum difference value of 0.2 pixels per picture period was found to be a reasonable figure. Also, it was found that the accuracy of vector assignment in some areas of the picture could be improved by measuring the sum of the modulus pixel difference across an area slightly larger than that of the decision block (areas roughly one pixel bigger all round were tried).

As discussed in Ref. 5, the accuracy of the vector assignment process can be improved if the modulus error summed over a transmission block is multiplied by a weighting factor that increases with the magnitude of the vector. This means that where two vectors fit an area almost equally well, there will be a bias towards selecting the smaller vector. Thus areas devoid of significant detail tend to get assigned the same small vector all over rather than a mixture of vectors of various sizes. Future investigatons will look at the possibility of other improvements to the vector assignment process, such as reassigning a vector if a block has a different vector from all its neighbours.

The overall accuracy that is required for the motion vector measurement process can be estimated by considering the way in which the picture is sampled and reconstructed. Four successive fields of information are combined to make one output picture, so if there is a measurement error of one pixel over that period of time then there will be a significant drop in the amplitude of a frequency having one cycle in two pixel periods (the Nyquist limit). Hence motion vectors should be measured to an accuracy better than about a quarter of a pixel per field period, or half a pixel per picture period. The phase correlation technique discussed above is capable of accuracies of about 0.2 pixels per picture period without anything cleverer than quadratic interpolation between points on the correlation surface. Hence this technique should be easily adequate for this application.

Although the motion vector measurement technique of Ref. 5 has been found to be very effective, there is no reason whyo ther techniques could not be used in the bandwidth reduction system of this invention, as long as their performance reaches the figures discussed above.

As mentioned earlier, the input picture should be subjected to a mild diagonal spatial filter and a vertical-temporal filter prior to sampling. In practice there are so few frequencies in real pictures with high diagonal components that this filter can be dispensed with for test purposes without having any significant effect on the results. This was done with the hardware described above, and has also been done in the computer simulations described here.

The vertical-temporal filter needs to be 'motion compensated' when used with moving sample structures since picture material moving with the assigned velocity vector must be considered to be statinary. This means that the locations of input samples to the filter must be displaced by the sum of the motion between the field containing the input samples and the 'central' field. This means that sub-pixel interpolation is required, since the motion vectors are known to sub-pixel accuracy. In practice, however, this interpolation can be performed by changing the values of the filter coefficients slightly. Each transmission block must be filtered separately since it has its own motion vector and its own motion history.

In order to transmit a moving object in the 'high detail' mode, it is necessary for the sampling structure to move with the object. The reason for this can be readily understood in terms of the current European 625 line interlaced TV system. Interlace is optimal for objects which do not move vertically; in such a situation it is possible to reconstruct a full 625 line sequential picture of the object (although motion compensation techniques would still be needed if there is any horizontal movement). As soon as the object starts to mvoe vertically, it is no longer being properly sampled. At a speed of movement of one picture line per field period, the same sites on the object are being sampled every field, and the scan has become effectively 312 lines sequential. If, however, the scanning raster were locked to the object, it would always be possible to reconstruct a highly detailed sequential image. The situation with the bandwidth reduction system under discussion here is very similar, except that the sampling structure is effectively interlaced in the horizontal direction as well.

Figure 5:
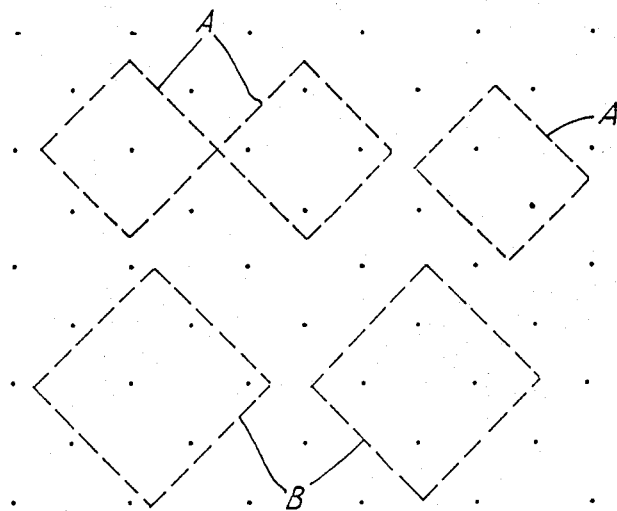
FIG. 5 represents the effect of block size on the number of samples in a block.

Each little diamond shaped transmission block must be considered to have its own sample structure which moves according to the motion vectors for that block. This immediately places a restriction on the size and shape of the transmission blocks, since in order to maintain a constant data rate we must always transmit a fixed number of samples per block. As FIG. 5 shows, a diamond shaped block A 6 pixels wide could contain 1, 2 or 4 samples depending on the relative positon of the block and sample structure. The only reasonable block sizes that satisfy the 'fixed number of samples' criterion are square or diamonds 4 or 8 pixels wide. Diamonds B 8 pixels wide were choosen for this investigation, as this size roughly matches the apertures of the spatial filters. The advantage of using diamond rather than square blocks is that since many, possibly most, objects have horizontal or vertical edges, there are less problems with edges of objects moving out of many blocks simultaneously and making the block structure more obvious. There would probably be advantage (from the point of view of picture quality) if smaller blocks were used, but this would increase the bit rate of the digital part of the transmission link unacceptably. Indeed, it may become necessary to use larger blocks to limit the bit rate further.

Figure 6:
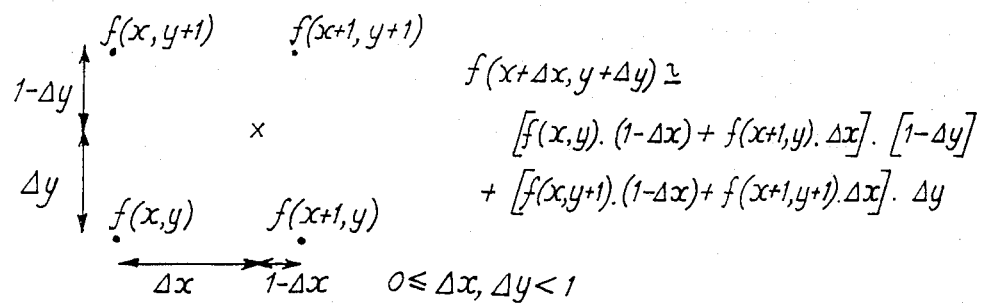
FIG. 6 represents a simple two-dimensional linear interpolator.

The 'first' set of samples to be taken in a transmission block are sited as shown for field 1 in FIG. 1. The next set of samples are taken at the positions shown for the sample sites in field 2, but shifted by the motion vector assigned to the block. Where samples are required at points between input sample sites, a simple linear interpolator was used (FIG. 6). This is bound to limit the spatial frequency response somewhat (especially vertically if the source is interlaced) but the use of a more sophisticated interpolator would help. Subjectively, the improvement made by upgrading to an interpolator based on cubic spline fitting was marginal, but the processing time required increased significantly.

Initial investigations allowed this process to continue 'ad infinitum', so that the sample structure could wander indefinitely.

This approach has several drawbacks:
(a) A moving object could come to rest such that the sample structure was displaced by one picture line from its 'natural resting place'. This would mean that samples were alway being interpolated between two field lines, resulting in poor vertical resolution. This problem would be much less acute with a sequential source.

(b) The sample structure of two adjacent blocks could move it opposite directions, resulting in a permanent gap being left in the sample structure as a whole.

(c) Any transmission error in the digital motion vector information would cause the receiver to lose track of the correct sample structure location, since the location of every sample depends on the complete motion history of the block.

In order to avoid these problems, a method was devised where the position of the sample structure is reset to its 'field 1' position at the start of every 4 field period. Thus the position of the structure is nevery more than 3 motion vectors away from where it started. However, this means that each set of 4 fields must be dealt with in isolation, and the reconstruction process must look 'forwards' in time, as well as 'backwards.' This is discussed in more detail below.

When the sample structure moves by more than 4 pixels horizontally or vertically, it is of course necessary to let 'new' sample sites move into the block as others 'fall off' the edge. As discussed above, the block size was chosen so that new sample sites always come in as others fall out, maintaining a constant number of samples per block.

We now consider the process required to reconstruct a complete sequential picture from four fields' worth of subsamples.

Each transmission block is reconstructed separately. The reconstruction process can be though of as placing the samples from each of the 4 subsample phases in appropriate places in a 'framestore' in such a way taht at the end of the process, half the locations in the framestore are filled with samples, forming a quincunxial pattern. The other half of the locations are then interpolated using a two dimensional spatial interpolator, as in the stationary picture case of FIG. 2.

Figure 7:
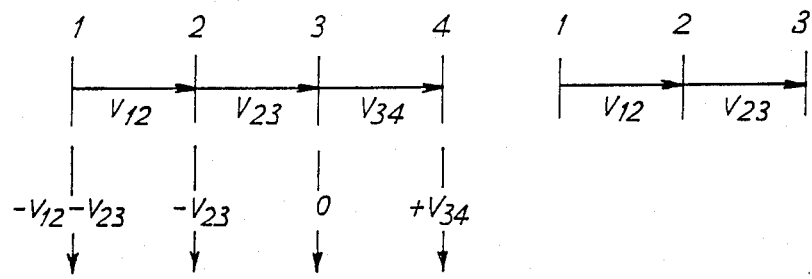
FIG. 7 represents reconstructing a detailed image using motion vector information.
Figure 8:
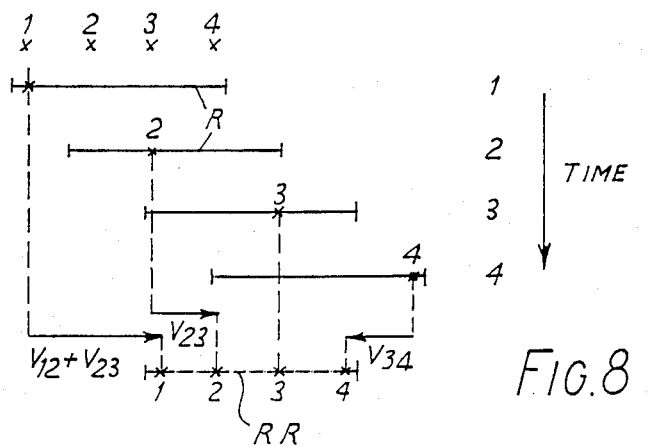
FIG. 8 represents the reconstruction process shown for a onedimensional case.

Each output picture is formed from the 4 fields of samples containing the current 'phase' (see FIG. 7). The numerals 1, 2, 3, 4, 1 . . . represent the fields of the subsample sequence. The first fields 1 are always sampled at fixed sites. The field to field motion vectors $V_{12}$, $V_{23}$ and $V_{34}$ are symbolized by arrows. The vectors $V_{41}$ are not used. Then, by way of example, the shifts which are applied to reconstruct field 3 analagously to FIG. 2 are shown. For example, field 2 is shifted by $-V_{23}$. One set of samples will thus not need to be moved by any motion vector since they refer to the same time as the current output picture. The other three sets need to be moved by an amount equal to the sum of the motion vectors between the time when the samples were taken and the time corresponding to the output picture. Since the sites that were sampled were offset by the same sum of motion vectors, the final arrangement of samples after the reconstruction process is guaranteed to be quincunxial, like the lattice shown in FIG. 1. The reconstruction process is illustrated for a one dimensional case in FIG. 8 with the sample sites of fields 1-4 illustrated at the top in the absence of motion. A moving object is represented by a bar R in fields 1-4 with the shifted sampling points marked 1, 2, 3, 4 on each bar. Then the vector shifts of FIG. 7 are shown applied to form the reconstructed image RR for field 3, containing all four sampling points.

The exact location at which the samples end up is unlike to be coincident with the set of quincunxial sites available, since the location of the sites depends on the position of the subsample lattice for the corresponding input field. Hence each block in the final picture constructed in the framestore at the receiver could be out of position by up to half the spacing between quincunxial sites. This means that the sub-pixel interpolation is needed when reading out of the framestore, in order to make up for the distance between where the samples 'wanted' to go and the fixed sites available for them. The sub-pixel shift required is different for each block, since the length of the shift depends on the position of the sample structure at this point in time.

Figure 9:
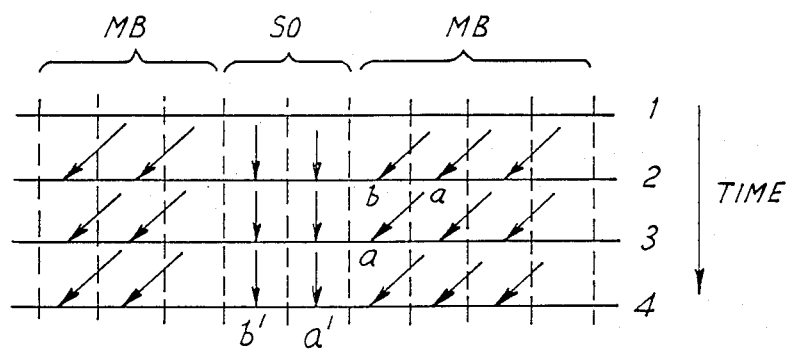
FIG. 9 represents the problem of obscured background and how 'following back' helps.

Problems can arise if each block in each phase is allowed to contribute to the output picture. We do not want an area of the picture which is visible in one phase of the sample structure but has been obscured in a later phae reappearing when the later picture is reconstructed. Thus it is necessary to work out which areas of the picture have become 'obscured', and not use samples from these areas in the reconstruction process. This problem is solved by 'following back' the vectors for each area of the output picture and using the picture information located 'along the way' in the reconstruction process. This means that each area of the output picture can have not more than four sets of samples contributing to it, and picture information that has become obscured is not used. FIG. 9 illustrates the potential problem and the way that this solution works. An example of the sort of picture information that calls for this special treatment is the edge of an object in the foreground moving fairly rapidly over the background. Without this 'follow back' technique, the leading edge of the object could fail to be reconstructed properly by the 'high detail' mode, and hence would revert to the 'low detail' transmission method. It may be that the extra sophistication required in the receiver to implement this algorithm is not warranted by the marginal improvement in quality obtained.

In FIG. 9 the broken vertical lines represent block boundaries.

Blocks SO pertain to a stationary object against a moving background MV, whose movement vectors are the diagonal arrows. Blocks marked a could end up at the site a' and the block b could end up at site b' using simple reconstruction techniques in reconstructing field 4. This means that obscured background intrudes into the stationary object. If, however, each arrow in the final phase is followed backwards and only blocks found 'on the way' are used, blocks a and b will not be used to generate the output picture. The same ideas apply when reconstructing using 'future' as well as 'past' fields.

In this example, the motion vectors have been chosen to be exactly one block width per field period for simplicity.

Problems can also arise at the junction between blocks if the motion vectors of the blocks point away from each other. In many cases, the sample structures move in such a way as to leave a few sites in the framestore unfilled. If the framestore was filled with zero samples prior to the reconstruction process, this results in little grey dots appearing in the output picture. This problem can be avoided by first filling the framestore with an image derived only from the current input sample phase, using a spatial interpolator to fill in the missing 75% of the samples. Thus if any quincunxially positioned sites in the framestore are not filled by the reconstruction process, the picture data visible in these sites will be from a sort of 'low detail' version of the current field. This effectively means that the system can revert to the low detail mode on a pixel by pixel basis in an area of revealed background, without the whole of the transmission block switching to low detail mode. The 'low detail' field used to fill the framestore is not a true low detail version of the input picture, since it is derived from a set of samples of a picture which has not been prefiltered with a suitable spatial filter. This means that there will be some aliassng in detailed areas, but since we only need this information to fil in a few pixels, this is not of major importance.

We now briefly describe the 'fallback' low detail transmission mode, which is the same as that used in Ref. 3. If the motion measurement and moving subsampling algorithms are working well, this mode should only be needed in areas of the picture containing erratic motion of uncovered background.

The input picture is prefiltered and subsampled as shown in FIG. 3. The subsample lattice is 'fixed' in the sense that it follows the 4 field sequence of FIG. 1 and does not move to follow objects as the 'high detail mode' sampling lattice does. An output picture is reconstructed using a spatial interpolator, producing a field that can be compared with that obtained by the 'high detail' mode as described below.

The method used in this investigation to select which transmission mode is the most appropriate for each block is the same as the method used in the hardware described earlier (Ref. 3). For completeness this method is described briefly here.

For each transmission block, the modulus difference between the original signal and the signal after passing through both the 'low' and 'high' spatial detail modes is calculated. The sums of the errors across the block area are compared after multiplying by a weighting factor, and the method giving the smallest error is used to transmit the block. The weighting factor used for these investigations was 0.55 for errors in the low detail mode, and 0.45 for errors in the high detail mode. This biases the mode selection slightly in favour of the high detail mode, as this was found to give the best subjective impression.

An experiment was tried whereby the area of the picture over which the errors were summed was increased to be slightly larger than the area of a transmission block. Although this gave a marginal improvement in some areas of the picture, further investigations are needed to find out if this technique gives a more reliable mode selection technique.

Once a mode has been selected for a transmission block, the subsamples corresponding to that mode are transmitted. However, the samples in the framestore in the 'detail' part of the transmission system are not changed if the low detail mode is selected. This means that the output of the high detail part of the system at the transmitter will not be exactly the same as the signal decoded at the receiver in this made if there has been a mode change in this set of four fields. The reason for not changing the samples is that the high detail mode will then be 'self consistent' and will not be corrupted just because one field did not give a good representation of the signal. This should guard against the system getting 'stuck' in the low detail mode. Also, since the reconstruction technique looks both forwards and backwards in time, it is not possible to update the samples at the transmitter in a sensible way, since it would be necessary to know which fields were transmitted in which way before the reconstruction process was started.

The simulation work that has been performed to date has shown that the performance of the basic adaptive subsampling system can be significantly enhanced by the addition of motion vector information. Work on the picture sequence from which FIG. 3 of Ref. 3 is taken, for example, has shown that the car can be transmitted in the high spatial detail mode with minimal impairments, whereas without motion vector information it reverts to the low detail mode. The moving gate in this sequence can happily be transmitted in the low detail mode, however, since it is moving sufficiently fast (about 2.4 pixels per field period) that there is little spatial detail on it anyway.

There are still some minor impairments present in the output pictures. For example, the edges of the car appear slightly odd, probably because the corresponding transmission blocks contain two sorts of movement. Initial investigations did not use a vertical-temporal prefilter in the 'detail' path, and it is possible that the inclusion of such a filter (motion compensated of course) may reduce the amplitude of picture information which is not being correctly followed by the motion measurement system. This may reduce the amplitude of vertical lines which tend to appear in areas not moving in a well defined way. The appearance of such spuriae could also be reduced by increasing the sizes of the various filter apertures to enable them to have sharper cutoffs.

There is scope for optimising parameters, such as the aperture sizes used in the vector assignment and mode assignment stages, the 'high velocity' weighting factor, the 'mode selection' weighting factor, and various details of the vector measurement stage. Thought also needs to be given to the dimensions of the measuring and transmission blocks, the number of 'menu' vectors required, and the resolution required for the vectors. Many of these parameters will be dependant on the available bandwidth in the digital part of the transmission link.

Figure 10:
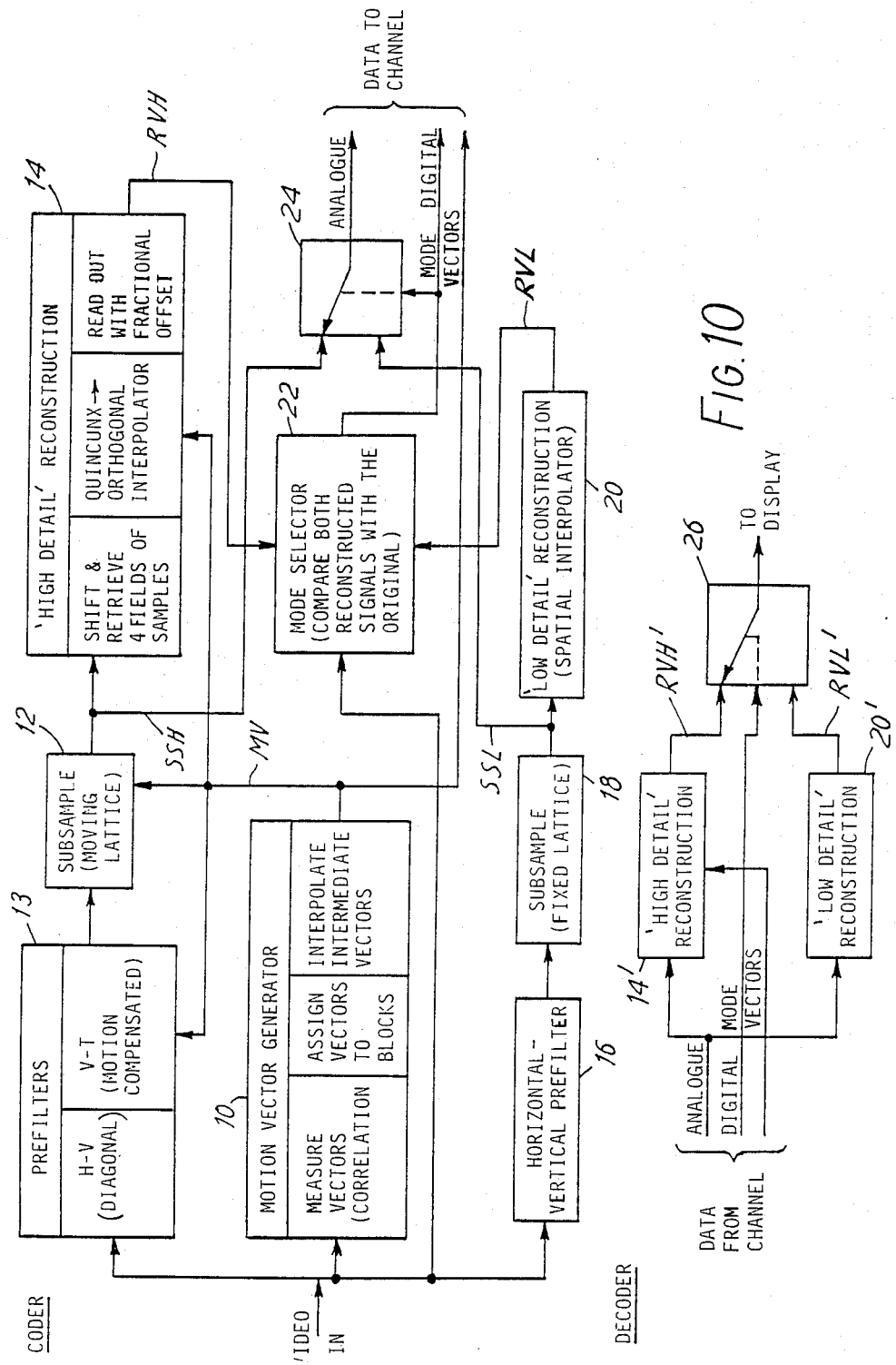
FIG. 10 is a block diagram of a complete transmission system embodying the present invention.

We have thus described a method of applying motion vector measurement to a video bandwidth reduction system based on motion adaptive subsampling. FIG. 10 shows a block diagram of the complete transmission system. Computer simulation of the technique has produced promising results, showing a significant improvement over the performance of the original (non-vector) system. Already the technique appears to be good enough to form the basis of a high definition television bandwidth reduction system, and more work should improve its performance further.

No detailed description of the hardware is necessary since the system is built up from such well known items as filters and interpolators. The motion vector generator 10 is constructed as described in reference 5. The motion vectors MV are used to control the positions of the sampling points in the sub-sampling unit 12 which follows the pre-filters 13 and serves the high detail mode whether there is movement or not (zero vector) and provides high detail sub-sampled picture data SSH. The sampling points are moved essentially by shifting the sampling times.

High detail reconstruction 14 is implemented as desribed above to convert SSH back to high detail reconstructed video RVH.

A prefilter 16 and fixed lattice sub-sampling unit 18 provide low detail sub-sampled (spatially filtered) picture data SSL. Spatial interpolator 20 effects low detail reconstruction to convert SSL back to low detail reconstructed video RVL.

A mode selector 22 compares both RVH and RVL with VIDEO IN (suitably delayed) and controls a switch 24 which selects between SSH and SSL as the reduced-bandwidth analogue signal to be transmitted (recorded). The data transmitted comprises the analogue signal plus a digital signal carrying both the motion vectors MV and the mode signal indicating whether a block is being sent as SSH of SSL.

At the receiver (playback machine) the decoder comprises high detail reconstruction 14' and low detail reconstruction 20' constructed as blocks 14 and 20 in the coder. The high detail unit 14' uses the received motion vectors as described above and a switch 26 is controlled by the received mode signal to select between RVH' and RVL' as the video output signal fed to the display.

The bandwidth reduction system described offers a reduction of a factor of about 4 with an interlaced input signal. The system is capable of supporting the full resolution offered by sequential sources and displays, and provides a bandwidth reduction factor of 8 with such signals. The transmitted signal can be packaged to look like a signal with a fewer number of lines, and with minimal processing could be displayed on a simple receiver to give a reasonable picture.

In the embodiment desribed above, the sampling structure movement is such that the sampling structure is 'reset' every 4 fields to its original starting position, and is moved during the following three fields to follow any movement. This has the effect of sampling the same points on a moving object that would be sampled if the object were stationary.

It is possible to obtain essentially the same sample values if the samples are all taken during the first picture in the four field sequence (assuming perfect motion measurement and allowing for any differences in the prefilters), and the other three fields are not sampled at all. Information in the other fields is still used in order to generate a sequential picture out of the first interlaced field; this process uses motion vector information.

The advantage of this approach is that any errors in the motion vector measurement process will no longer manifest themselves by the appearance of the subsampling structure on the picture. Errors will instead appear as slight discontinuities at block edges; this will probably be less annoying subjectively.

Using this approach, the transmission system appears as a 12½ Hz sequential system, with sample shuffling for the purposes of compatible transmission, and frame rate up-conversion at the receiver, aided by motion vector information sent in the digital assistance channel. The low detail 'fallback' mode is still present, of course.

Transparent interconversion between source and display standards, using motion compensation (Reference 1), suggests a method of bandwidth reduction. Such a method may be suitable for the transmission of HDTV. It would, however, require the use of a digital assistance channel. It turns out that this system is very similar to the method suggested in References 3, 4 and 5. By viewing this method from a different perspective, the considerable differences from the NHK MUSE system (Reference 6) become more apparent. Furthermore, this viewpoint suggests possible improvements to the method described above.

The basis of this method is motion compensated temporal subsampling. This reduces the signal redundancy due to temporal frequencies caused solely by moving objects. Picture quality is preserved by transmitting this information, in the form of motion vectors, at much reduced bandwidth, as a digital assistance channel.

The following description concentrates on a 'detailed' picture channel. This channel carries information from stationary and well correlated moving areas. As in references 3 to 5 and in FIG. 10 there would also be a low detail channel. This would be used when the detailed picture channel failed due to poorly correlated image content. In the absence of an HDTV standard the method of described for a conventional 625 line source. The method can, of course, be translated for use with an HDTV source.

Figure 11:
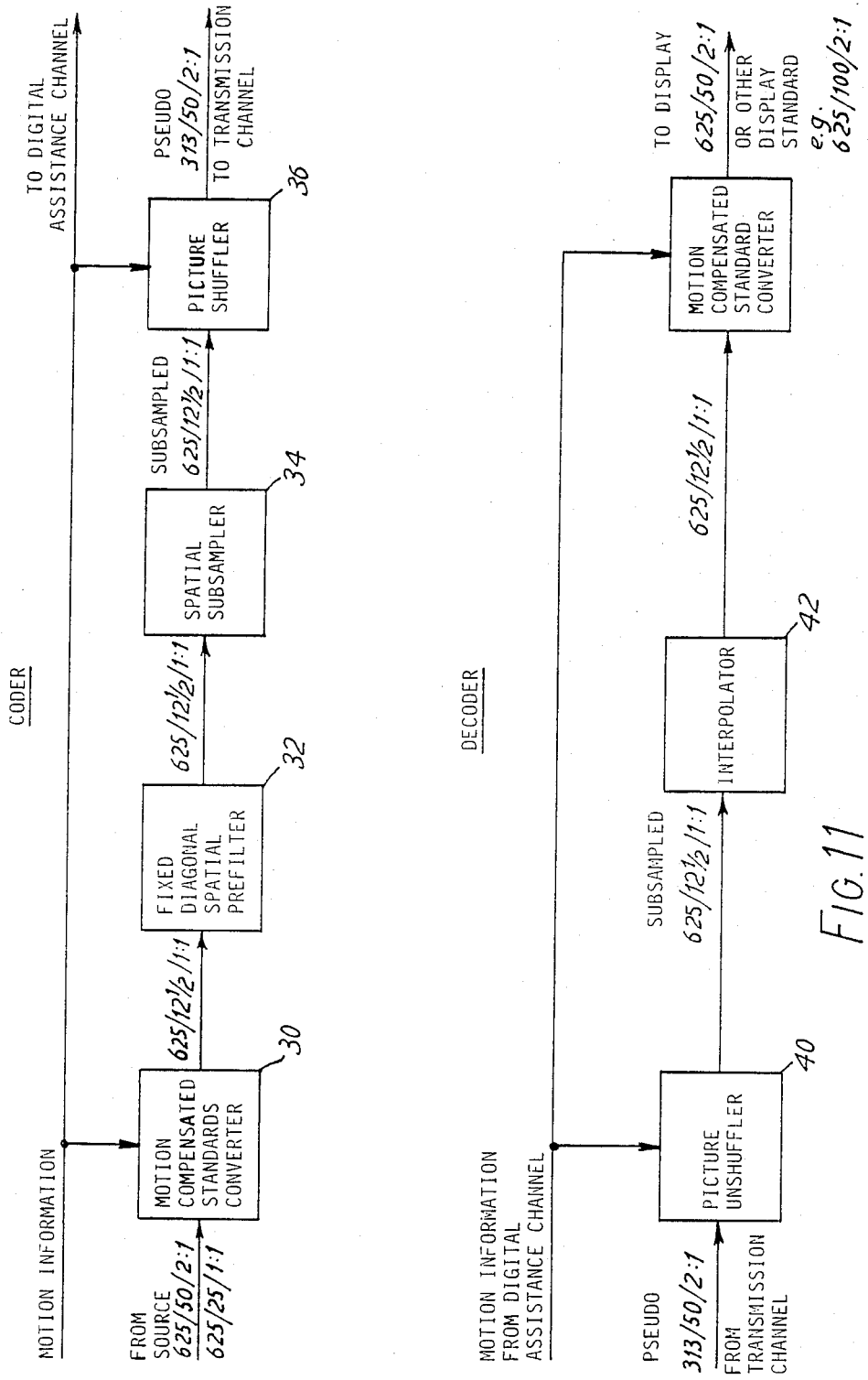
FIG. 11 is a block diagram of a second embodiment of the invention.

The first part of channel (shown in FIG. 11) is a motion compensated standards converter 30. This would produce an output at 625/12 1/2/1:1 from an input at 625/50/2:1 (video) or 625/25/1:1 (film). If, as is likely, the input were from interlaced video, this converter would have to perform an implicit interlace to sequential conversion.

This is followed by a spatial (diagonal) prefilter 32, which permits the use of 2:1 spatial subsampling in sub-sampler 34. Appropriate filtering results in little reduction of picture quality, as described in the above Reference 3, 4 and 5.

A practical implementation of this system would combine these first two blocks. The combined filter/standards converter would require no more hardwave than the pre-filter only.

Figure 12:
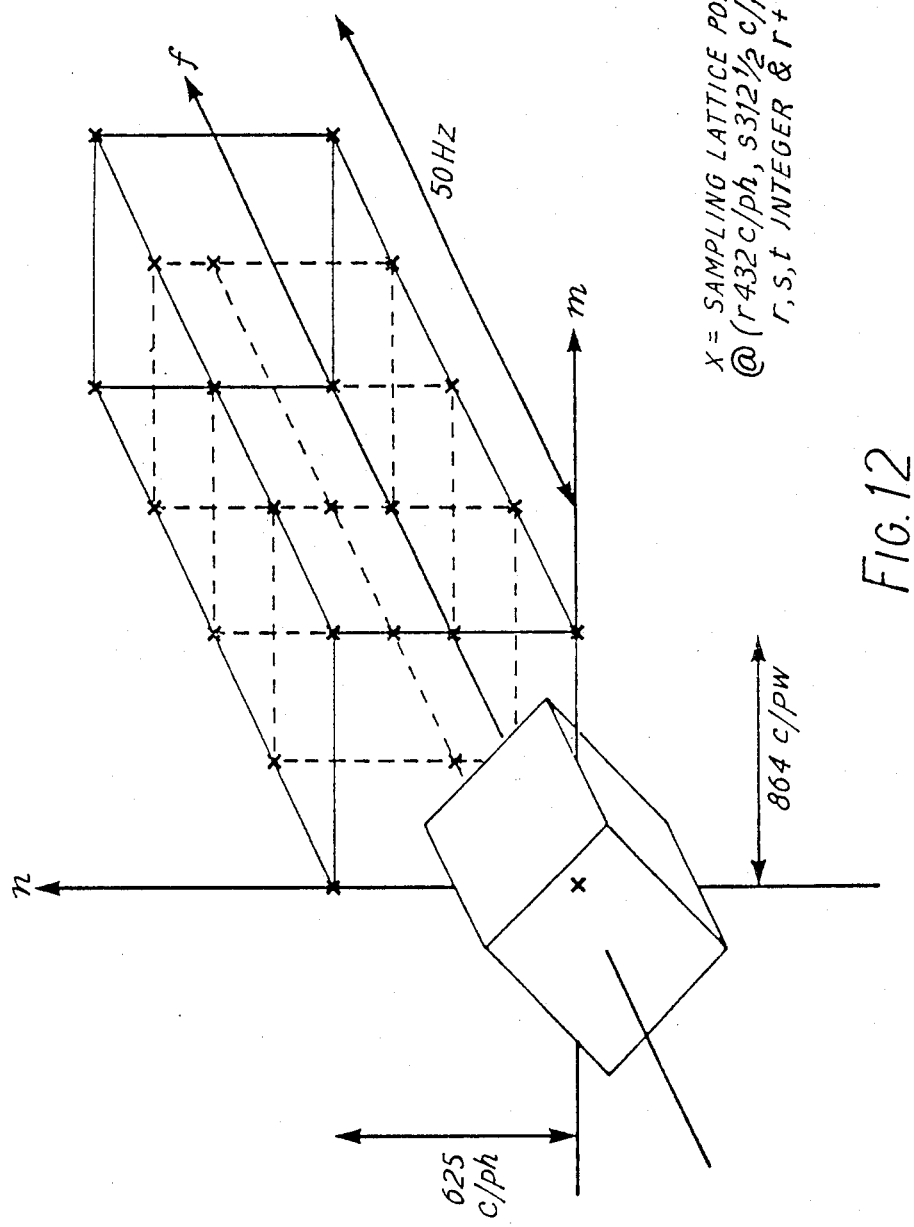
FIG. 12 and 13 show prefilter characteristics for the system of FIG. 11.
Figure 13:
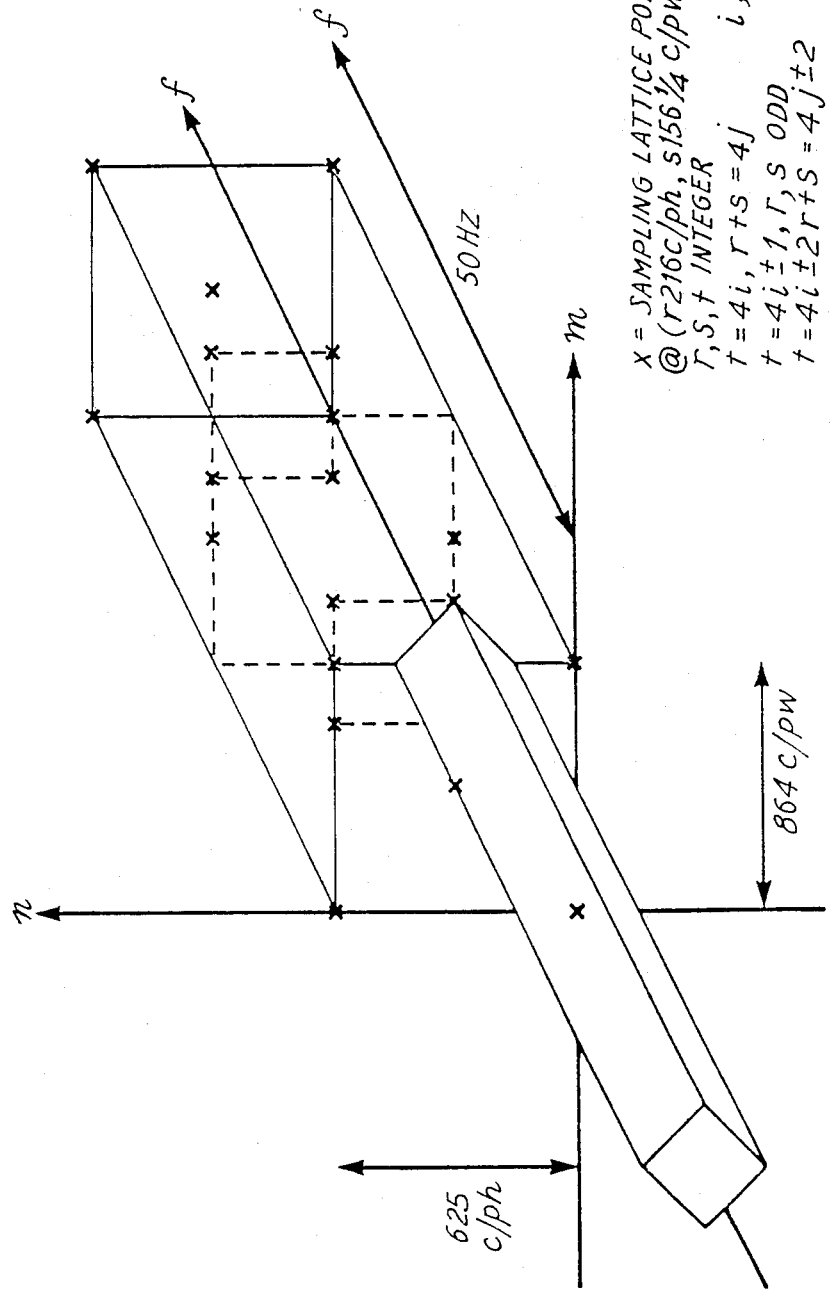

The spatio-temporal filter used is shown in FIGS. 12 and 13. FIG. 12 shows the pre-filter used in the detail channel. The filter shown is for a stationary object; it would be skewed appropriately for a moving object. The fixed pre-filter used in the low detail channel is shown in FIG. 13.

Figures 14A, 14B:
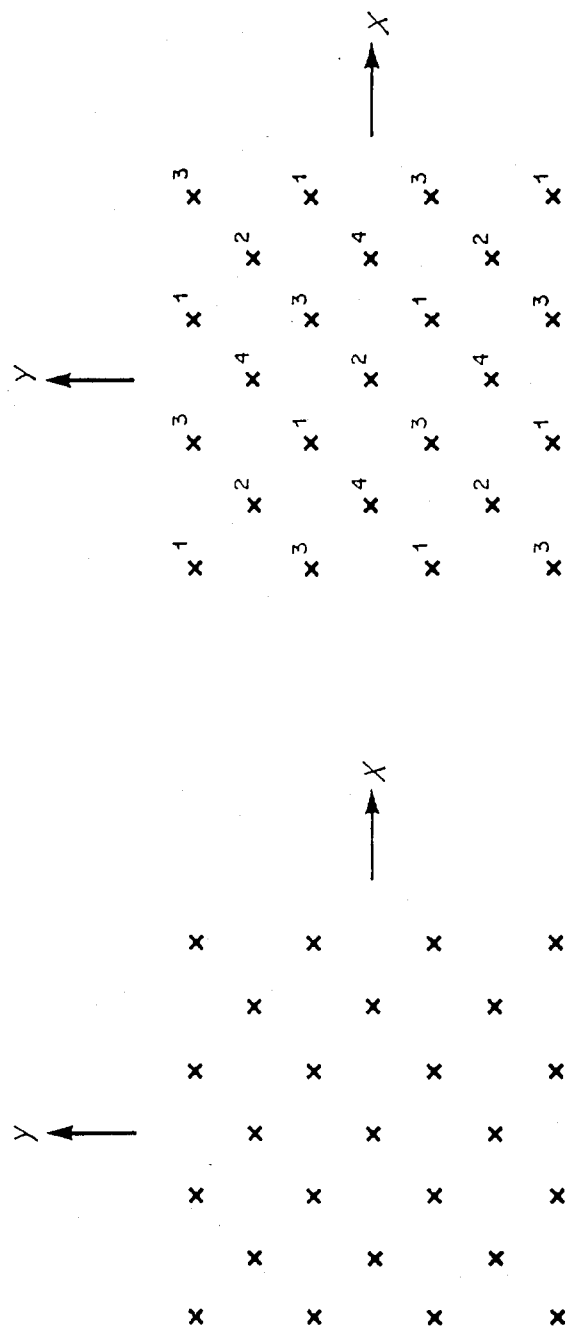
FIG. 14a and 14b show sampling lattices for the embodiment of FIG. 11.

FIG. 14a shows the sampling lattice used for the high detail channel, and repeated at 12½ Hz. FIG. 14b shows the four field sequence of sampling points used at 50 Hz for the low detail channel.

The temporarily subsampled output from the standards converter would then be shuffled in shuffler 36 to resemble a (313/50/2:1) pseudo quincunxial signal. In an HDTV system the subsampled signal could be shuffled to resemble a compatible 625/50//2:1 signal (reference 4). The shuffling would be done by displacing objects, using motion vectors, so that they appeared in the right place at the right time. No sub-pixel interpolation is performed. Displacement vectors, used for shifting objects, rounded to the nearest pixel vertically and horizontally.

The pseudo quincunxial signal can then be transmitted, with the associated motion information transmitted in a digital assistance channel.

The received signal is unshuffled in un-shuffler 40 and interpolated in interpolator 42 to produced a 625/12 1/2/1:1 signal. This signal is then up-coverted, using a motion compensated standards converter 44, to the required display standard. Again in a practical system the interpolation filter 42 and standards converter 44 would be combined.

The ultimate display standard is of little relevance to the actual transmission of the signal. This means that while the obvious display standard may be the same as the source, other display standards are equally valid. For example, the pictures could be displayed at 625/10p0/2:1; all the information required for a (notional) up conversion is present in the digital assistance data. The pictures could even conceivably be displayed on a 60 Hz standard. It is interesting to note that the motion portrayal of a film source would automatically be improved by the use of this bandwidth reduction system.

This system achieves a bandwidth reduction by a factor of 4:1. This approach to bandwidth reduction may be less susceptible to small errors in the measurement of motion vectors. Transmission via a pseudo quincunxial signal is for compatibility with transmission of a low detail signal. This latter mode of transmission would be used in areas of poorly correlated or erratic motion.

The hardware requirements for a simple version of this system are comparable with tose for the system of reference 5 and FIG. 10 above. Indeed much of the hardware is identical.

A simple version of the transitter standards converter could be built initially. It would simply interpolate the 'missing' lines in field 1 (of a 4 field sequence) from field 2, using motion vectos. Fields 3 and 4 would be discarded. These fields would, however, be used for motion measurement. At a later date a more sophisticated converter, with more hardware andusing fields 3 and 4, could be built. This should improve system performance.

A simple version of the output standards converter could also be built. It would displace moving objects to their correct position in the output field using motion information. Sub-pixel interpolation would be used to give the best output picture. At a later date a more sophisticated standards converter could be used to improve performance.

There are two main improvements to be gained by the use of better standards converters. Firstly they should reduce the noise on the output pictures. This is due to their narrower (motion compensated) temporal bandwidth. Second they should reduce temporal aliasing arising other than from the motion of objects. This is achieved by appropriate (motion compensated) pre and post filtering.

Figure 15:
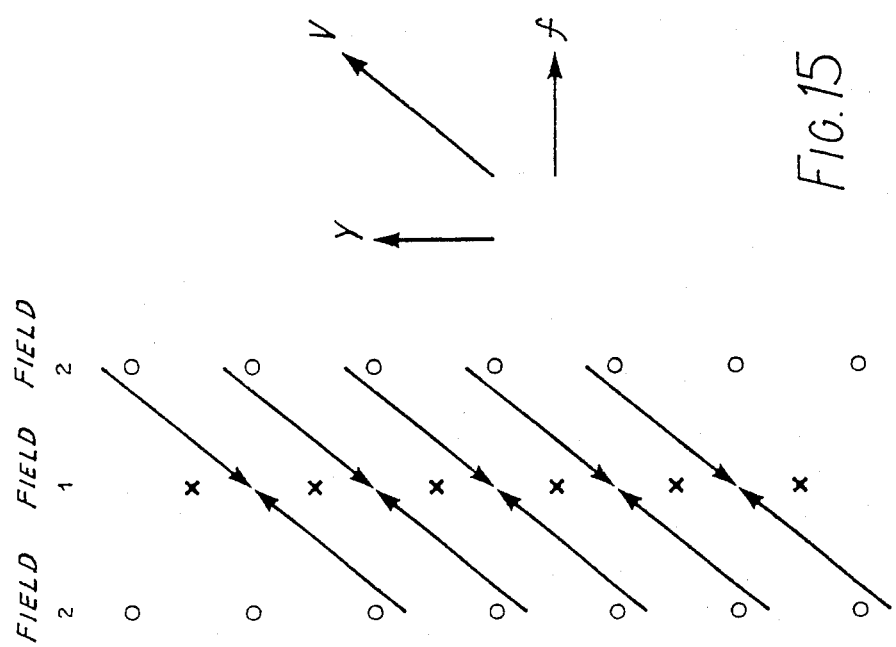
FIG. 15 illustrates the action of a simple interlace-to-sequential converter.
Figure 16:
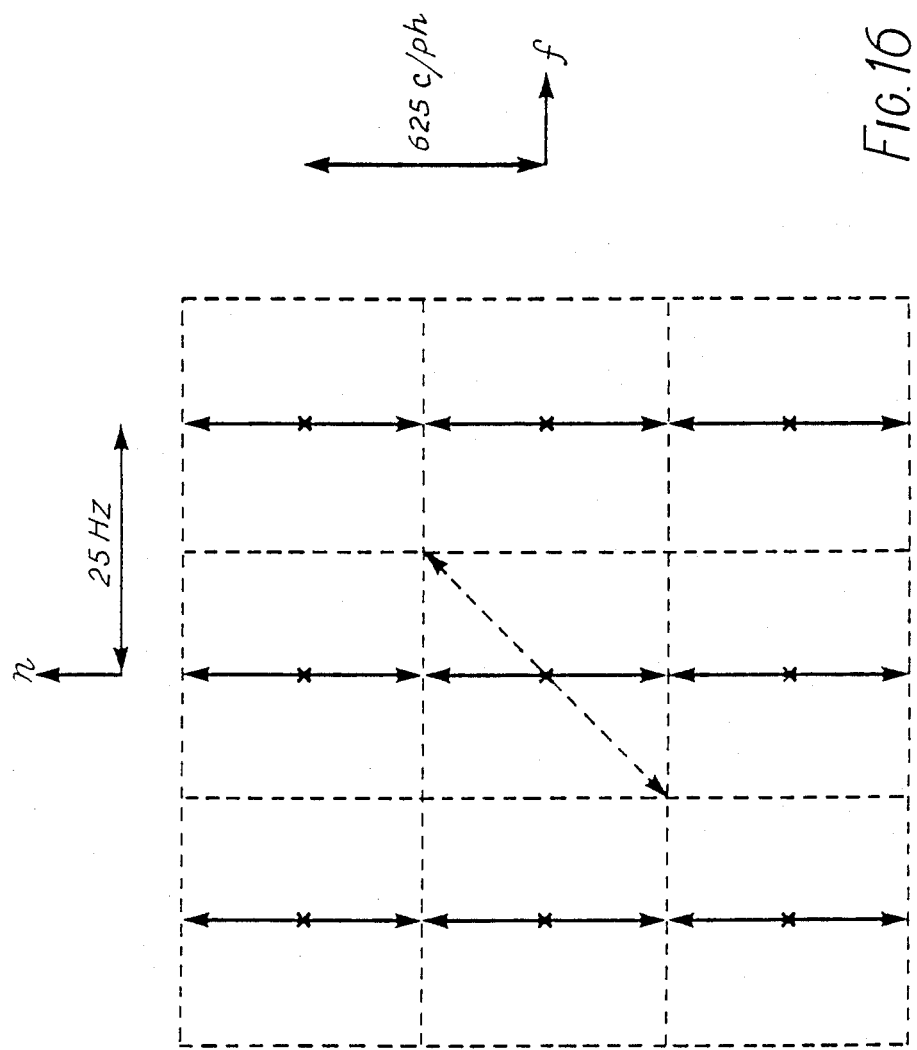
FIGS. 16 to 19 illustrate the spectra of sampled objects moving at various velocities.

Interlace to sequential conversion is a process of interpolation. The missing intermediate lines in one field must be interpolated from adjacent lines in time and space. A straightforward approach is to interpolate the missing lines in one field from adjacent fields (before and/or after), allowing for the motion of objects. This is illustrated in FIG. 15, in which vector V represents the velocity of a moving object. Unfortunately this introduces spatial alias components. These arise because the (sampled) adjacent fields are interpolated and then shifted. Ideally the adjacent fields would be shifted before they were sampled, but this is impossible. Motion compensated conversion may be an improvement on fixed verticaltemporal filtering, because it produces spatial rather than spatio-temporal aliasing.

The problems inherent in interlace to sequential conversion can be appreciated by considering the frequency domain. Ideally the interlaced picture would be padded with zeros and filtered using an appropriate low pass aperture. FIGS. 16, 17, 18 and 19 show the spectra of a sampled stationary object, an object moving at 25s/ph, an object moving at 12s/ph and an object moving at 6.25s/ph (625/25/1:1). The dashed arrow in FIG. 16 corresponds to motion at 25s/ph.objects moving at various velocities. The dotted regions in FIG. 16 indicate appropriate motion compensated low pass filter apertures. These regions are shown as 'square' but this does not affect the arguments.

Figure 17:
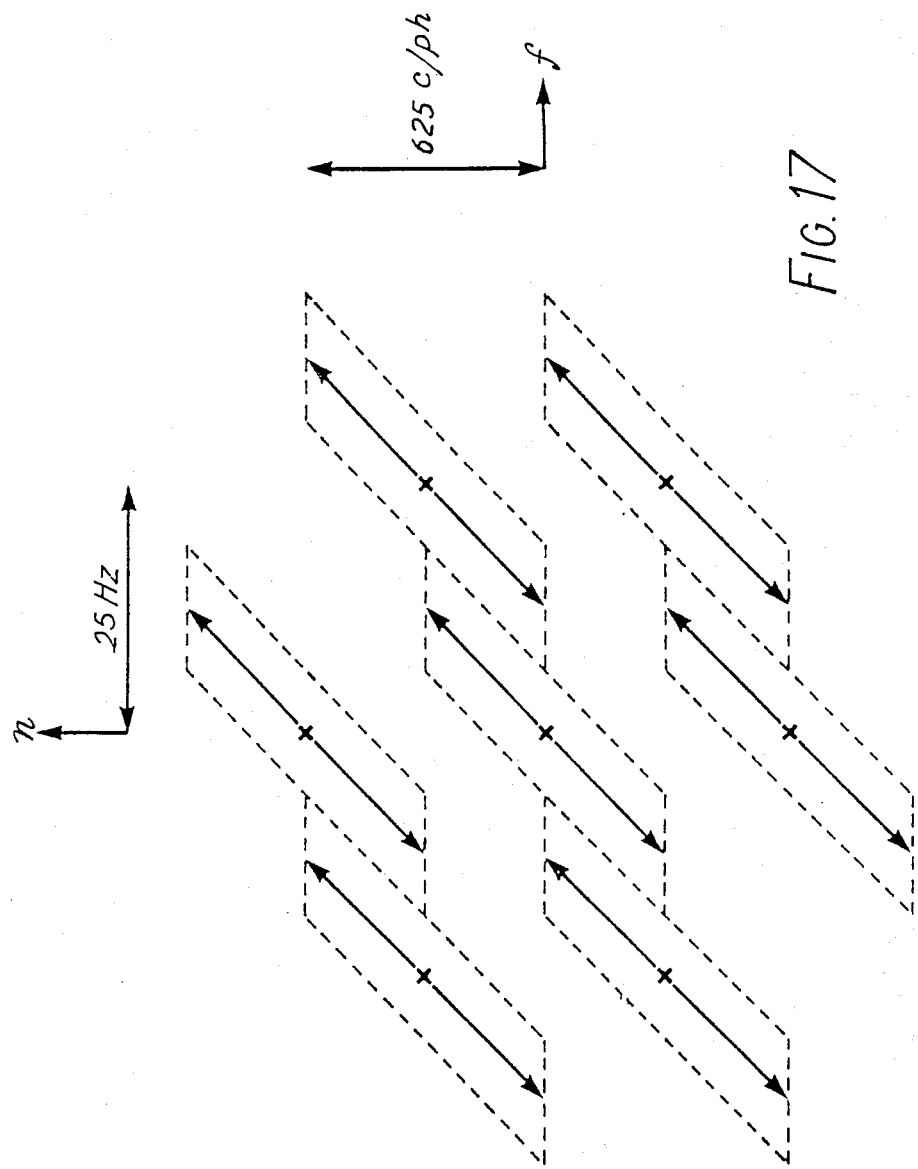
Figure 18:
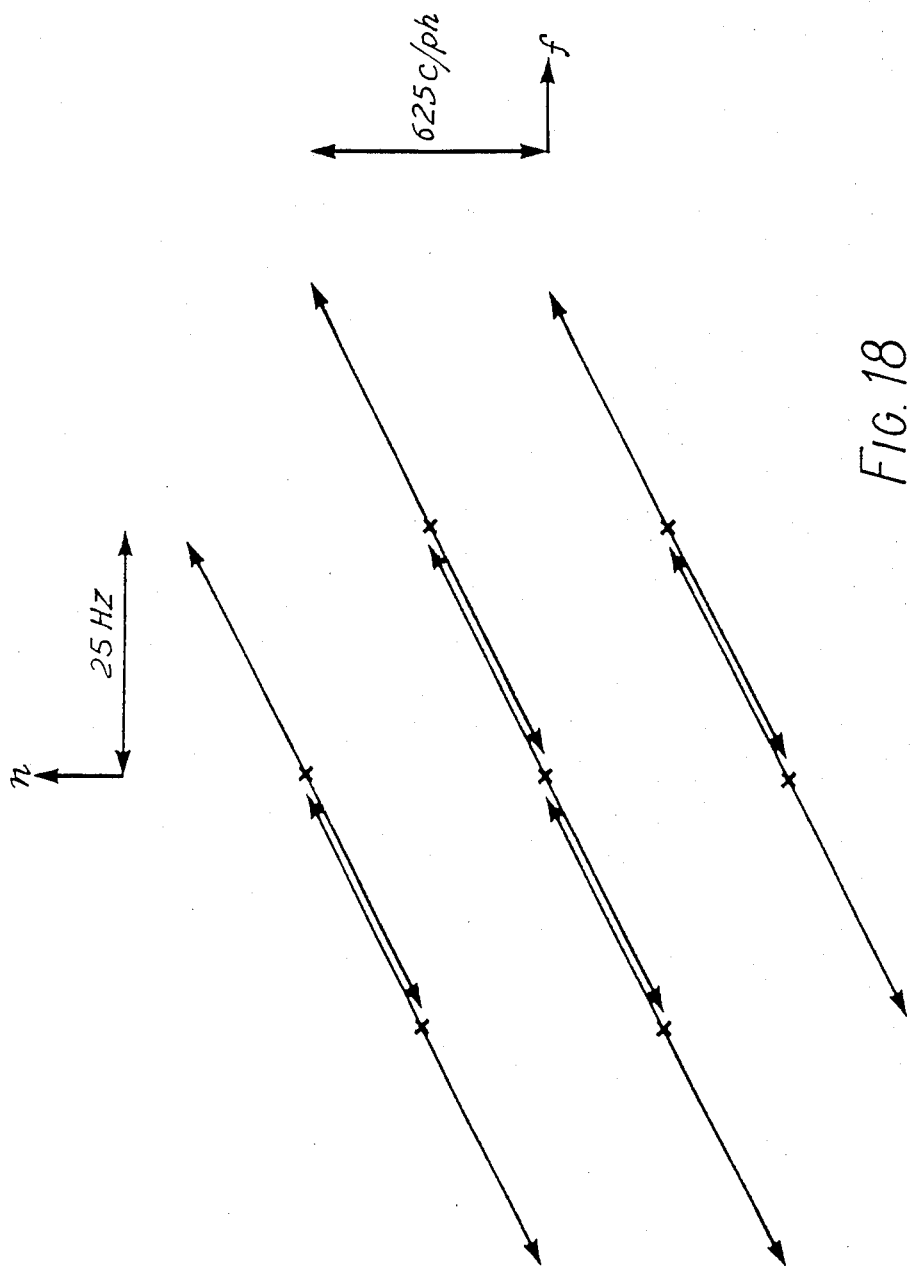
Figure 19:
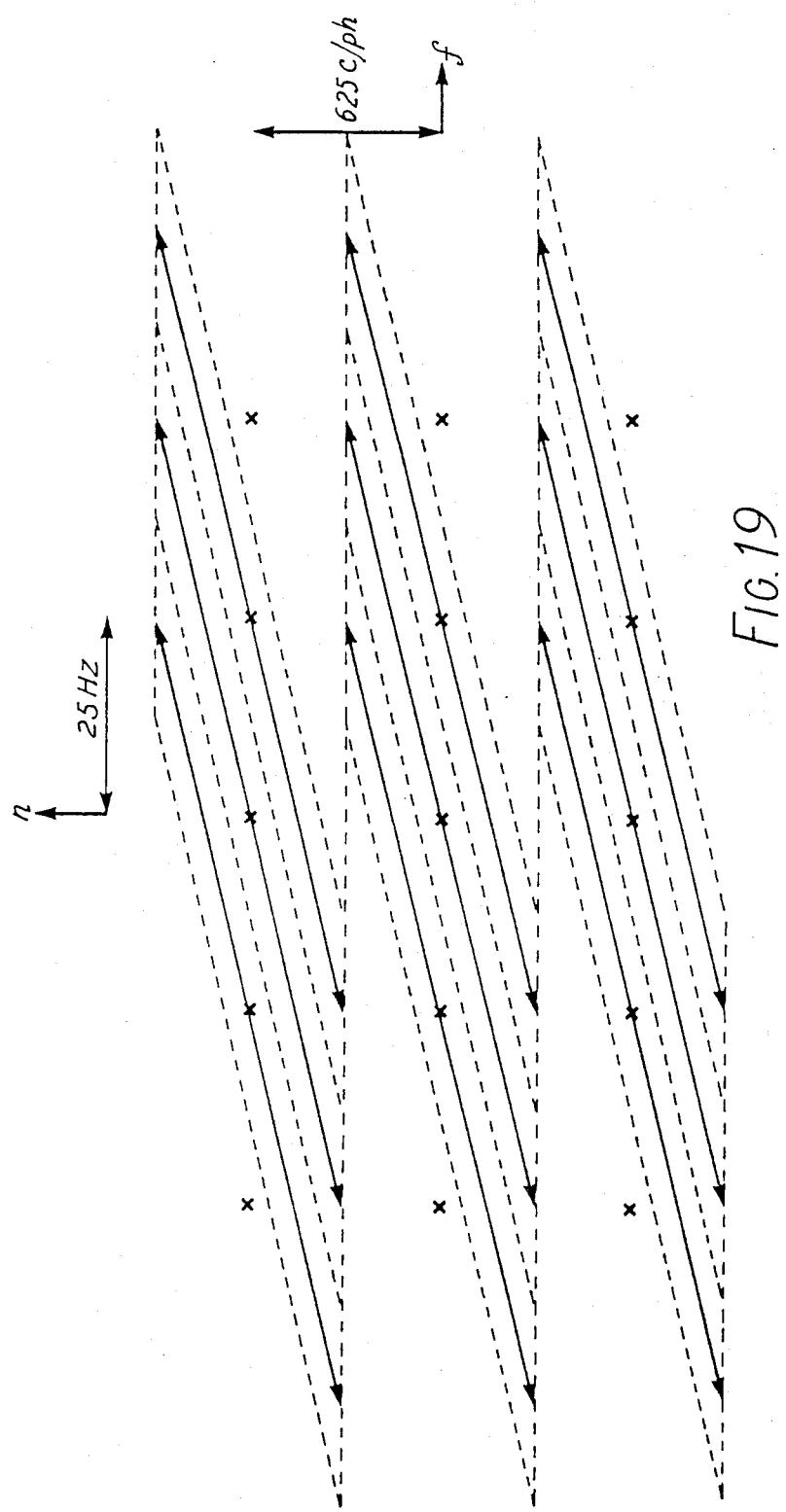

FIG. 17 shows that even at low speeds at appropriate low pass interpolation aperture can only occupy half the available bandwidth. This means that as the vertical speed of an object increases, the motion compensated interpolator is less and less able to cope with changes in shape etc. of moving objects. By the time the speed of an object reaches a slow 12s/ph (FIG. 18), a motion compensated interpolator produces unavoidable spatial aliasing.

These arguments suggest that even a motion compensated interpolator cannot perform transparent interlace to sequential conversion of other than very slow moving pictures.

It may be considered that an equal bandwidth sequential source is more appropriate for motion compensated picture processing than an interlaced one. If an interlaced source is used, the results are likely to be markedly worse than for a sequential one.

The discussion in this section has considered an 'ideal' source. That is one which contains the maximum possible signal content. Such a source is a respectable target to aim for with HDTV. Current sources, however, do not provide the maximum possible signal content. This means that impairments caused by interlace to sequential conversion, will be less severe with current sources than with the ideal sources described above.

We claim:

1. Receiving or playback apparatus for a reduced bandwidth video signal accompanied by a digital signal carrying motion vector information pertaining individually to a plurality of blocks of pixels, characterized by means for accumulating sub-sample points from the fields of each of a repeating cycle of fields, and means responsive to the motion vector information to shift the sub-sample points in accordance with the corresponding motion vector information so that the accumulated points provide a high-definition picture both in stationary areas and moving areas which are correlated from field to field.

2. Apparatus according to claim 1, characterised by means for interpolating intermediate points among the accumulated points.

3. Apparatus according to claim 1, wherein the accumulated points of each field are derived from both preceding and succeeding fields of the same cycle of fields.

4. Apparatus according to claim 1, wherein the accumulated points of each field are derived only from that field and preceding fields.

5. Apparatus according to claim 1, further comprising means for reconstructing a picture by spatial interpolation of the sub-sample points received in one field only and means responsive to a mode signal accompanying the video signal to select for output between the picture reconstructed by accumulation of points and the picture reconstructed by spatial interpolation.

6. Apparatus according to claim 5, wherein the selecting means switch abruptly at the junction between two blocks sent in different modes.

7. Apparatus according to claim 5, wherein the selecting means switch gradually at the junction between two blocks sent in different modes.

8. Apparatus according to claim 1, comprising a framestore in which the high-definition picture is reconstructed and means for filing the framestore with an image generated by simple interpolation from the subsample points of a single field, before reconstruction by accumulation of points take place.

9. Apparatus according to claim 1, characterized by means for tracking motion vectors back from the field being reconstructed and for causing sub-sample points not to be included in the accumulation thereof when they pertain to a preceding or succeeding field and to a motion vector not reached by the tracking from the field being reconstructed.

10. Apparatus according to claim 1, comprising a following motion compensated standards converter responsive to the motion vectors.

11. Apparatus for producing a reduced bandwidth video signal from an input video signal, characterized by means for generating motion vectors describing the movement of each of a plurality of blocks of pixels making up a picture, means for sub-sampling the input video signals to provide in each field of each of a repeating cycle of fields a corresponding sub-set of picture points in correct spatial relationship to the points of the other fields of the same cycle, and means providing a composite signal comprising the video signal created by the sub-sampling means and a digital signal conveying the motion vectors.

12. Apparatus according to claim 11, wherein the sub-sampling means take all sub-sets of picture points for one cycle from the first field of that cycle.

13. Apparatus according to claim 11, wherein the sub-sampling means take each sub-set of picture points from the corresponding field, utilizing a sampling lattice displaced in accordance with the motion vectors describing the displacement of each block.

14. Apparatus according to claim 13, wherein the sampling lattice is restored to a datum position for the first field of each cycle.

15. Apparatus according to claim 11, comprising means for producing an alternative reduced bandwidth signal by field to field sub-sampling implementing spatial filtering, and means for selecting block by block between the two reduced bandwidth signals to utilize that signal which best matches the input video signal.

16. Apparatus according to claim 15, wherein the selecting means comprise means for reconstituting a high-definition signal from the first-mentioned reduced bandwidth signal, by accumulating subsample points from the fields of each cycle, shifted in accordance with the motion vectors, means for reconstituting a low-definition signal from the alternative reduced bandwidth signal by spatial interpolation and means for comparing each reconstituted signal with the input video signal to determine which provides the better match.

17. Apparatus according to claim 16, whereinthe comparing means performs a weighted comparison favouring the high-definition signal.

18. Apparatus according to claim 15, comprising a spatial pre-filter preceding the field to field sub-sampling means.

19. Apparatus according to claim 15, wherein the composite signal includes a mode signal indicating which reduced bandwidth signal is selected.

20. Apparatus according to claim 11, wherein the sub-sampling means are preceded by a vertical-temporal or temporal filter whose input samples are so displaced by the motion vectors that each moving block is filtered as if it were stationary.

21. Apparatus according to claim 11, wherein the sample structure is quincunxial and repeats over a four field cycle.

22. Apparatus according to claim 11, wherein the input video signal is an interlaced signal, the motion vectors are measured from picture to picture and these motion vectors are interpolated to provide field to field motion vectors.

23. Apparatus according to claim 11, wherein the means for generating motion vectors implement phase correlation between blocks of two successive images to extract dominant vectors as peaks in a correlation surface and each pixel or block of pixels is then assigned that one of the motion vectors which produces the match from image to image.

24. Apparatus according to claim 23, wherein the phase correlation is applied to large blocks and the vector assignment is to small blocks.

25. Apparatus according to claim 11, comprising a preliminary motion compensated standards converter responsive to the motion vectors.

* * * * *